United States Patent [19]
Suzuki et al.

[11] Patent Number: 6,057,621
[45] Date of Patent: May 2, 2000

[54] CYLINDRICAL RADIAL GAP TYPE MOTOR STRUCTURE

[75] Inventors: Yuzuru Suzuki; Sakae Fujitani; Masaki Kagawa; Yoshiyuki Aono, all of Shizuoka-ken, Japan

[73] Assignee: Minebea Co., Ltd., Nagano-ken, Japan

[21] Appl. No.: 09/186,147

[22] Filed: Nov. 5, 1998

[30] Foreign Application Priority Data

Nov. 7, 1997 [JP] Japan .................................. 9-306115

[51] Int. Cl.[7] .................................................. H02K 21/12
[52] U.S. Cl. ...................... 310/156; 310/258; 310/269; 310/187; 310/216; 310/254
[58] Field of Search .................................. 310/156, 258, 310/269, 187, 216, 254

[56] References Cited

U.S. PATENT DOCUMENTS

| | | | |
|---|---|---|---|
| 4,514,655 | 4/1985 | Hosoya | 310/218 |
| 5,105,115 | 4/1992 | Shinryo et al. | 310/258 |
| 5,627,424 | 5/1997 | Steiner | 310/258 |
| 5,757,108 | 5/1998 | Suzuki | 310/49 R |
| 5,780,951 | 7/1998 | Stephens | 310/172 |
| 5,852,335 | 12/1998 | Suzuki et al. | 310/254 |

Primary Examiner—Nestor Ramirez
Assistant Examiner—Thanh Lam
Attorney, Agent, or Firm—Staas & Halsey LLP

[57] ABSTRACT

Salient poles made from soft magnetic steel plates have tip sections of approximately the same length as a rotor magnet. The salient poles are constructed with laminations in the circumferential direction, with axial dimensions adjusted with respect to the circumferential dimensions determined by the constraints of the winding to allow winding sections with a minimum required cross-sectional area so that magnetic saturation does not occur. These winding sections are inserted into coils wound with magnet wire, and press fitted into the stator which makes the magnetic circuit with the salient poles and forms the armature.

11 Claims, 4 Drawing Sheets

FIG. 7
(PRIOR ART)
FIG. 8
(PRIOR ART)
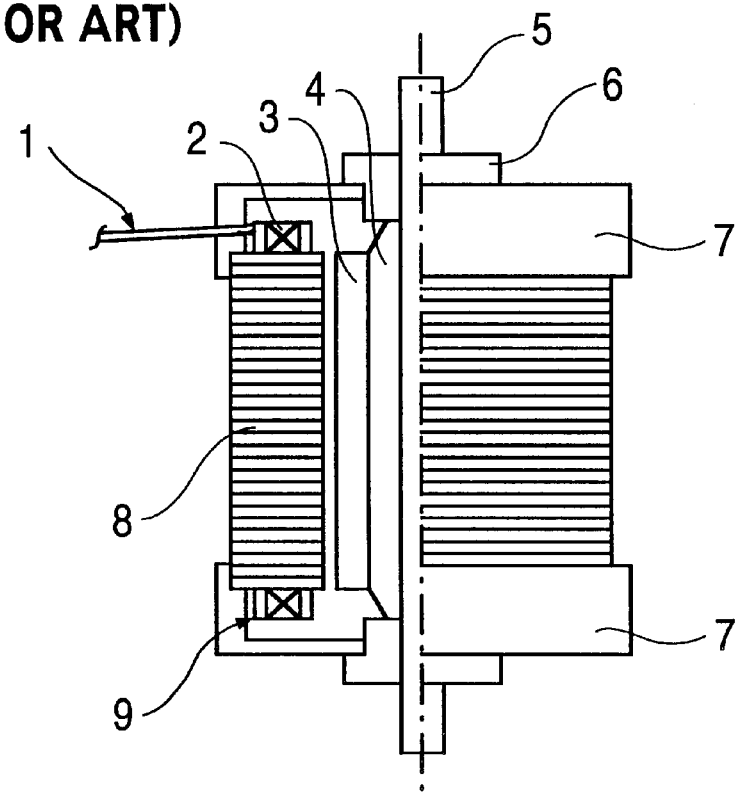
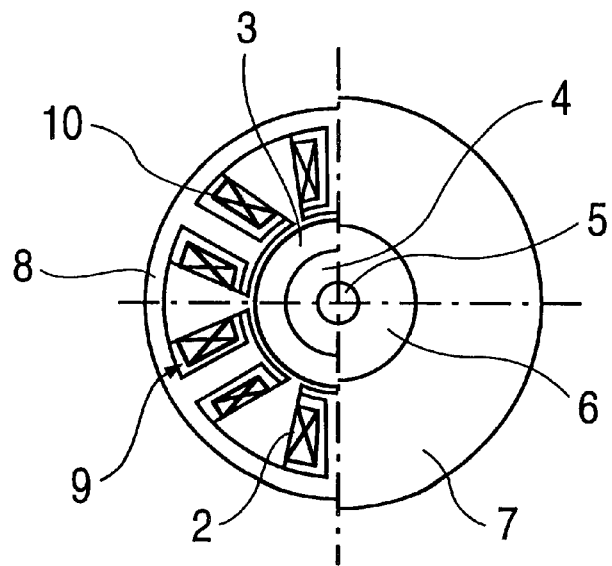

CYLINDRICAL RADIAL GAP TYPE MOTOR STRUCTURE

BACKGROUND OF THE INVENTION

1. Field of the Invention

The present invention relates to a cylindrical radial gap type motor structure and more particularly to a cylindrical radial gap type motor structure reduced in size, weight and cost.

2. Description of the Prior Art

Recently, the performance and especially speed of office automation devices has been increasing rapidly, and in order to support the required functions of these devices it has become common to employ a plurality of dedicated motors. Particularly, in the case of small DC motors, enhanced magnetic efficiency to better support required applications, diminished cogging torque and electromagnetic noise, and superior controllability are desired. Measures adopted so far to meet these demands include increasing the number of slots (salient poles) of the core, and increasing the number of poles of the magnet in order to improve the electromagnetic efficiency by shortening each magnetic circuit to decrease magnetic resistance. Further, the winding efficiency of the coil is increased by using a concentrated winding FIG. 7 shows the construction of a laminated, inner rotor type brushless DC motor, and FIG. 8 is the sectional view thereof. In these figures, the numeral 1 denotes a lead wire and numeral 2 denotes a coil. The coil 2 is constituted of magnet wire wound around a bobbin 9 vertically fitted on each salient pole 10 of a stator 8 which is formed by lamination of soft magnetic steel plates. Numeral 3 denotes a rotor magnet, and numeral 4 denotes a sleeve which connects the rotor magnet and a shaft 5 which acts as the rotational center of the rotor. Numeral 7 denotes a flange with a bearing 6 disposed centrally, which supports the rotor shaft 5. Two flanges 7 hold the stator 8 from both sides. The tip of each salient pole 10 is formed wider than the winding portion to increase interlinkage flux with the rotor magnet and hold the bobbin (coil). For the same reason, the laminated length of the stator 8 is made almost equal to the length of the rotor magnet 3.

However, as the number of slots increases, the slot spacing becomes narrower and hence the space available for the winding is not great enough for the required volume of winding unless the overall size of the motor is increased. If the size of the motor remains the same, the required volume of winding is not possible, and so a permanent magnet with strong magnetic characteristics is employed to obtain the desired motor characteristics, even though this leads to higher cost. In the construction of the conventional lamination type stator, it is required that the lamination thickness of the stator be made approximately equal to the length of the rotor magnet in order to ensure a predetermined area of opposition between the salient poles and the rotor magnet. As a result, the winding length for each turn of coil becomes larger and thus the winding efficiency is low. Besides, since the surface of each salient pole opposed to the rotor magnet is wide to ensure the aforesaid area of opposition and to hold the associated coil, the winding work efficiency is poor. This tendency is conspicuous particularly in the case of an inner rotor type motor. Further, the motor is heavy and difficult to handle because the stator is larger than necessary.

The present invention has been accomplished in view of the above-mentioned problems and it is an object of the invention to provide a cylindrical radial gap type motor which permits reduction in weight and greater efficiency in the same size as the prior art without using a laminated structure where the cylindrical stator is laminated in an axial direction.

SUMMARY OF THE INVENTION

In order to achieve the above-mentioned object, the present invention provides a cylindrical radial gap type motor structure having a rotor held rotatably by bearings held in flanges at both ends of the rotor, with a plurality of divided salient poles projecting from the stator held by the above flanges in the direction of the rotor wherein the salient poles are formed from soft magnetic material, and have a winding section and a tip section whose length is approximately the same as the length of the rotor magnet in the rotational axis direction.

The present invention further contemplates providing a cylindrical radial gap type motor structure in which salient poles are made from soft magnetic steel plate, laminated in a circumferential direction, formed-so that the salient pole tips are laid out in the axial direction of the rotor and have a difference in level with the winding section.

The present invention further contemplates providing a cylindrical radial gap type motor structure in which the salient poles are made from a high molecular material mixed with soft magnetic powder.

The present invention further contemplates providing a cylindrical radial gap type motor structure in which the soft magnetic material of the salient poles is made from sintered metal.

The present invention further contemplates providing a cylindrical radial gap type motor structure with the above mentioned salient poles of either soft magnetic powder material or sintered metal, wherein the salient poles' tip sections have a length in the long direction approximately equal to the length of the rotational axial length of the rotor magnet, and furthermore whose circumferential width is greater than the width of the winding section of the coil.

The present invention further contemplates providing a cylindrical radial gap type motor structure in which the stator, the salient poles and the armature of the coil are all molded as a one-piece structure made from high molecular material.

BRIEF DESCRIPTION OF THE DRAWINGS

FIG. 7 is a partial cross-sectional front view of a prior art.

FIG. 8 is a partial cross-sectional plan view of the prior art.

DESCRIPTION OF THE PREFERRED EMBODIMENTS

Embodiments of the present invention will be described in detail below with reference to the accompanying drawings.

Figure 1:
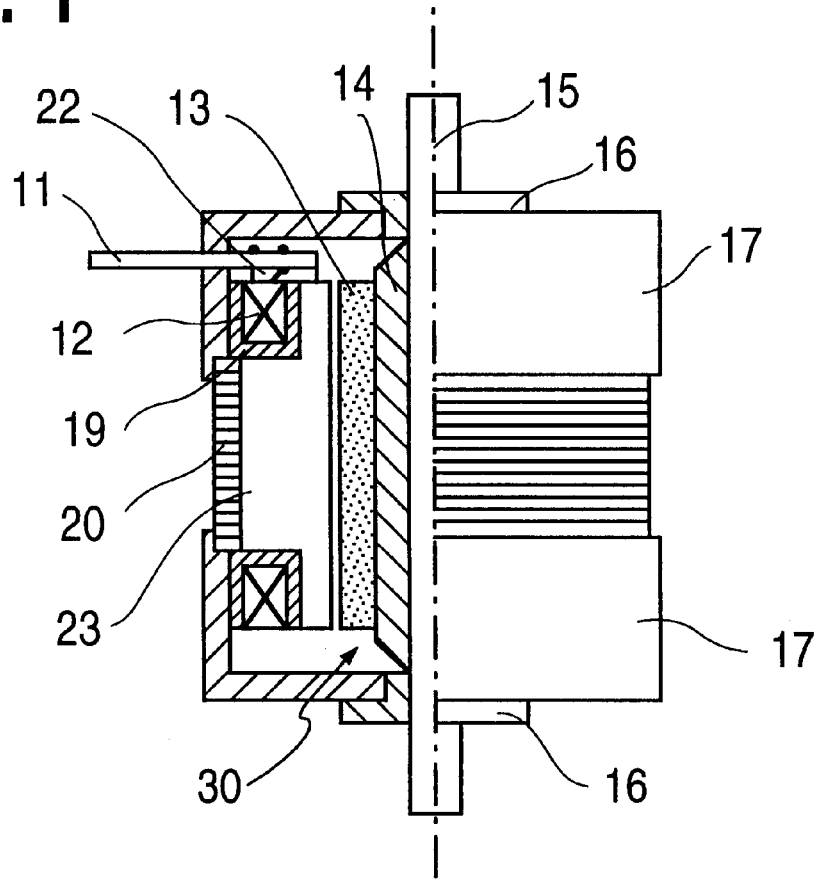
FIG. 1 is a partial cross-sectional front view, showing an embodiment of the present invention.
Figure 2:
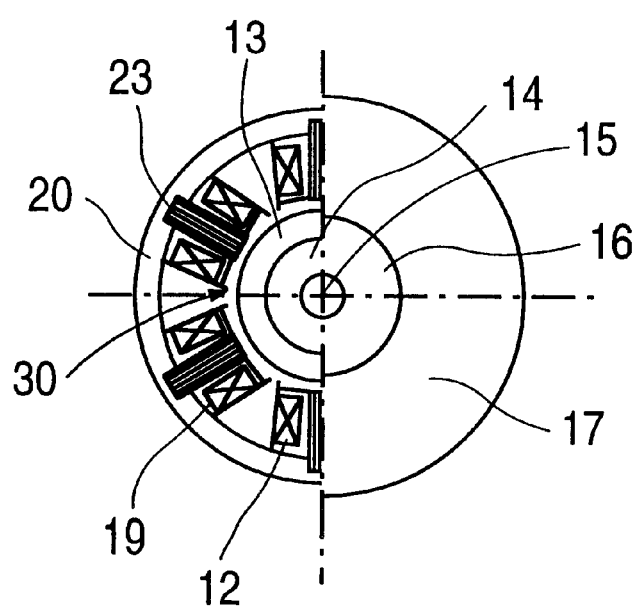
FIG. 2 is a partial cross-sectional plan view, showing an embodiment of the present invention.

FIG. 1 is a partial cross-sectional front view illustrating an inner rotor type brushless DC motor structure according to an embodiment of the present invention, and FIG. 2 is a partial cross-sectional plan view thereof. Numeral 11 denotes a lead wire, while numeral 12 is the coil constructed of a bobbin 19 wound with magnet wire. The terminal of coil 12 is connected to circuit board 22 which contains all the required wiring. Numeral 13 denotes the rotor magnet, and 14 denotes the sleeve which connects rotor magnet 13 with shaft 15, which forms the rotational center. Rotor 30 is constructed of rotor magnet 13 and sleeve 15. In the center of the end face of stator 20 is located bearing 16 which rotationally supports rotor shaft 15, and which is held in place by flange 17.

Figure 3:
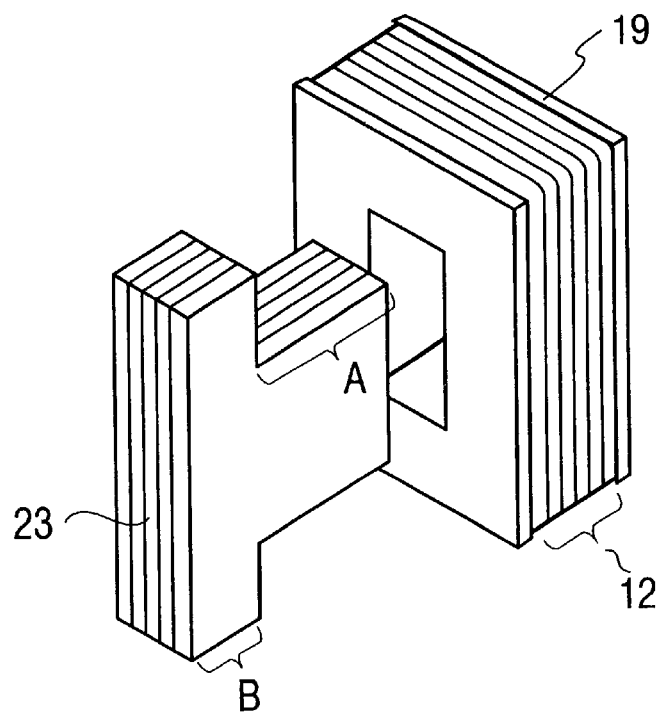
FIG. 3 is a disassembled perspective view of a salient pole.

The tip of salient pole 23 is made approximately the same length as the rotor magnet 13 in order to increase the interlinkage flux with rotor magnet 13. Salient pole 23 will be explained in detail with reference to FIG. 3. Salient pole 23 includes a winding section A and a tip section B. Winding section A is made with the minimum possible cross-sectional area in order to prevent magnetic saturation, while tip section B is made with the same length in the axial direction as rotor magnet 13 in order to increase the surface area in opposition to rotor magnet 13 and thus to increase the interlinkage flux with rotor magnet 13. Salient pole 23 is constructed in the above way from soft magnetic steel plates laminated circumferentially. Next, the winding A of salient pole 23 is inserted into the coil 12 which has been wound upon bobbin 19, and is press fitted onto the soft magnetic steel plate stator 20 to form the armature.

If the gap into which salient poles 23 are press fitted to the stator is formed at an inclined angle to the rotational axis, the salient poles 23 will be inclined-to the rotational axis and the salient poles 23 will substantially form a structure having a skew, allowing a motor with less cogging.

Figure 4:
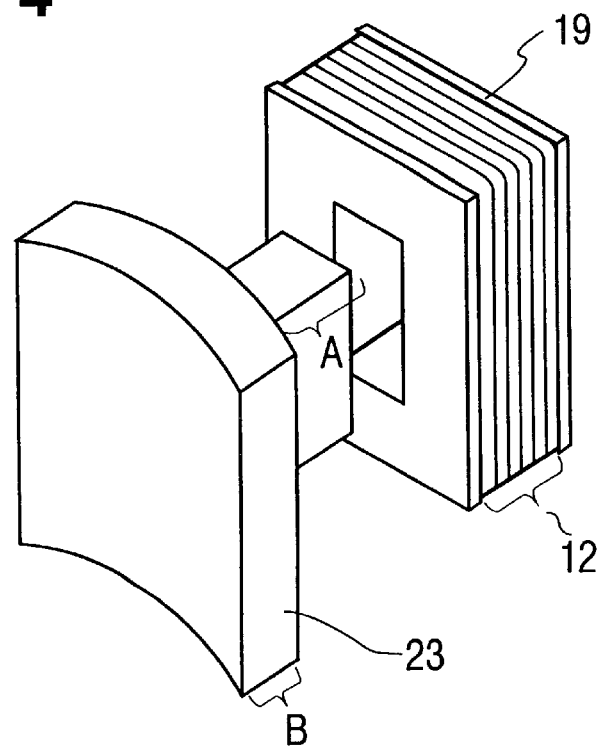
FIG. 4 is a disassembled perspective view of a salient pole, showing another embodiment.

In addition, it becomes possible to construct the salient poles 23 and stator 20 from soft magnetic powder containing high molecular material or from sinteren metal, thus avoiding the use of soft magnetic steel plate. FIG. 4 shows a salient pole 23 formed from sintered metal made from either soft magnetic powder or a soft magnetic substance. In this case, the shape can be formed with greater freedom than when plate material is used, so the tip B can be extended in the circumferential direction. Because tip B extends more in the circumferential and axial directions, magnetic flux is concentrated more efficiently in the rotor magnet 13. Winding section A is constructed so as to have the minimum necessary cross-sectional area.

Figure 5:
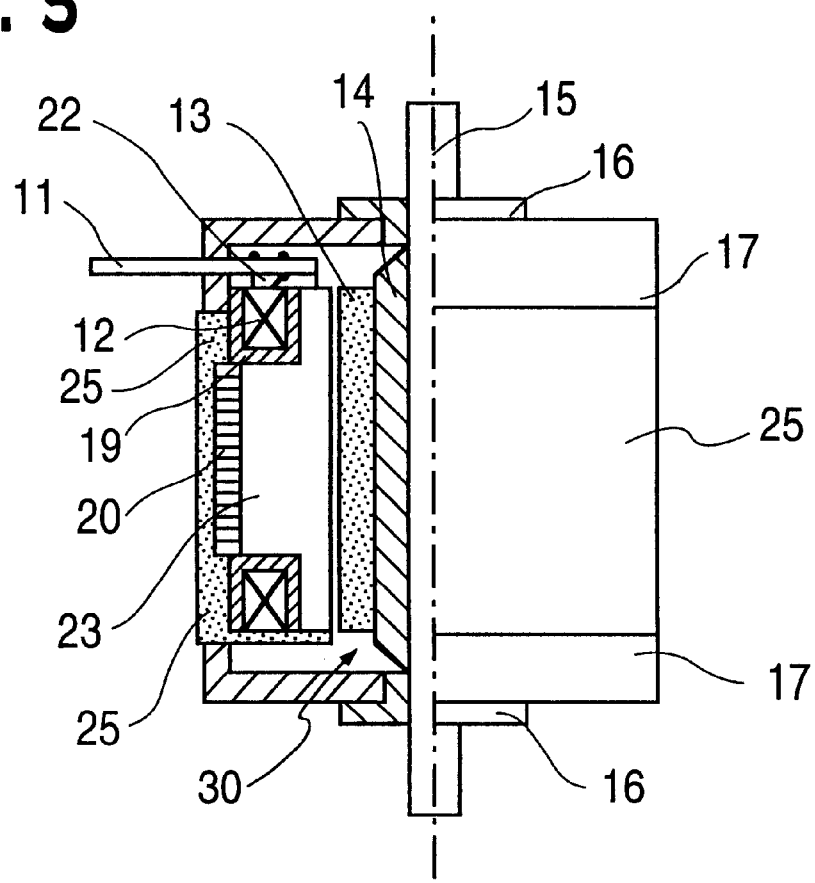
FIG. 5 is a partial cross-sectional front view of another embodiment.
Figure 6:
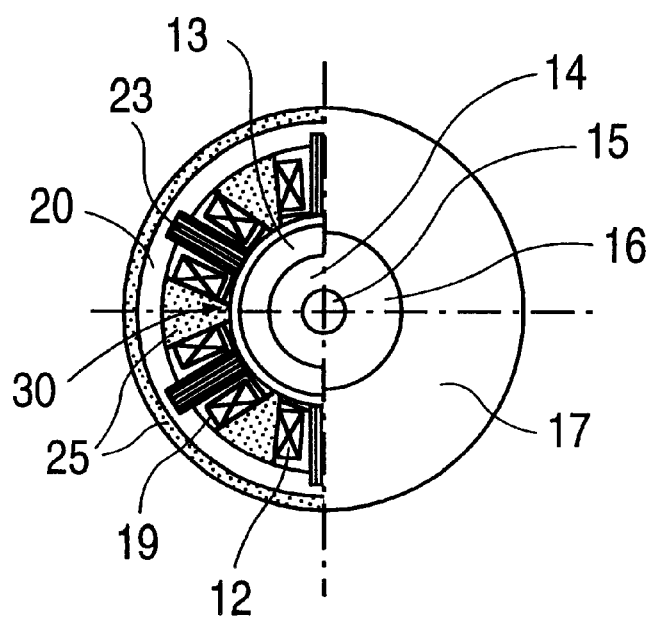
FIG. 6 is a partial cross-sectional plan view of another embodiment.

FIG. 5 shows an embodiment in which stator 20, salient poles 23, and coil 12 are formed of high molecular material 25 in a one-piece molded structure. This method of constructing the salient poles allows the elimination of a portion of the winding section which is not required but which could not be eliminated before due to the conventional construction of salient poles. In addition to allowing the winding section to be made smaller, the length of the alternating current winding, whose core has become smaller, can be shortened thus achieving a more efficient coil and hence a lighter, more efficient motor. Moreover, since even for a long cylindrical type motor the increase in the number of laminated soft magnetic steel plates can be kept to the necessary minimum, the cost of the motor can be kept low.

Although the present invention has been described above by way of embodiments thereof, various modifications and applications may be made within the scope of the invention, whose modifications and applications are not excluded from the scope of the present invention.

According to the present invention, even if the stator of the cylindrical radial gap type motor structure has long salient poles, the cylindrical radial gap type motor permits reduction in weight and greater efficiency in the same size as the prior art without using a laminated structure where the cylindrical stator is laminated in an axial direction.

According to another invention, the salient poles included soft magnetic steel plates which are laminated in a circumferential direction, so an eddy current loss will be reduced.

According to another invention, the salient poles are made from a high molecular material mixed with soft magnetic powder or soft magnetic sintered metal, and the salient poles are assembled with ease.

According to another invention, the coil's size is able to reduce, the weight of the motor, and a high cost efficiency motor will be obtained.

What we claim is:

1. A cylindrical radial gap type motor structure, comprising
    a rotor magnet held rotatably by bearings held in flanges at both ends of the rotor magnet, and having a length defined along an axis of rotation; and
    a stator with a plurality of divided salient poles projecting from the stator and held by the flanges to oppose the rotor
    wherein said salient poles are formed from soft magnetic material, and have a winding section which is press fit in the stator, and a tip section whose length is approximately the same as the length of the rotor magnet.

2. The structure according to claim 1, wherein said salient poles are made from soft magnetic steel plates which are laminated in a circumferential direction, and each tip section is laid out in the rotational axis direction of the rotor and has a difference in lend-th relative to the winding section.

3. The structure according to claim 1, wherein said salient poles are made from a high molecular material mixed with soft magnetic powder.

4. The structure according to claim 1, wherein said salient poles are made from soft magnetic sintered metal.

5. The structure according to claim 3 or 4,
    wherein said tip sections have a circumferential width greater than a width of the winding section.

6. The structure according to claim 1, wherein the motor further comprises a coil, and wherein the stator, the salient poles and an armature of the coil are all molded as a one-piece structure made from high molecular material.

7. The structure according to claim 1, wherein at least one of the salient poles is made of soft magnetic steel plates.

8. The structure according to claim 1, wherein at least one of the salient poles is made of soft magnetic powder containing one of high molecular material and sintered metal.

9. The structure according to claim 1, wherein the salient poles are press fit to the stator at an angle relative to the axis of rotation.

10. The structure according to claim 1, wherein each winding section is planar, and wherein each tip section is curved relative to the winding section.

11. The structure according to claim 1, wherein the winding section is smaller than the tip section.

* * * * *

UNITED STATES PATENT AND TRADEMARK OFFICE
CERTIFICATE OF CORRECTION

PATENT NO. : 6,057,621
DATED : May 2, 2000
INVENTOR(S) : Yuzuru SUZUKI

It is certified that error appears in the above-identified patent and that said Letters Patent is hereby corrected as shown below:

On the cover page items:

[75] Inventors

Delete "-ken".

[73] Assignee

Delete "-ken".

Col. 4, line 38, change "lend-th" to --length--.

Signed and Sealed this

Twenty-seventh Day of February, 2001

Attest:

NICHOLAS P. GODICI

*Attesting Officer*  *Acting Director of the United States Patent and Trademark Office*